B. E. SIMS.
CULTIVATOR ATTACHMENT.
APPLICATION FILED AUG. 29, 1919.
1,394,367.
Patented Oct. 18, 1921.
4 SHEETS—SHEET 4.
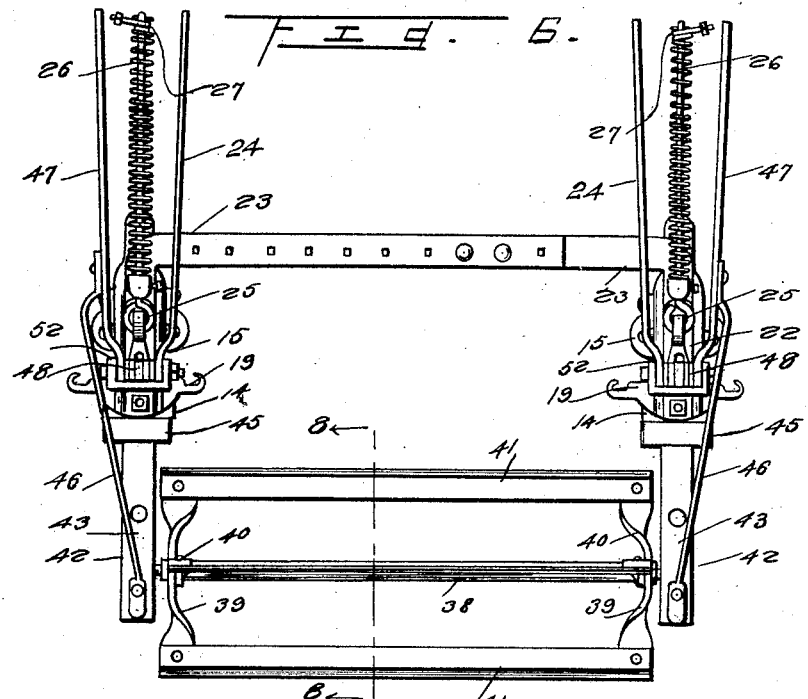
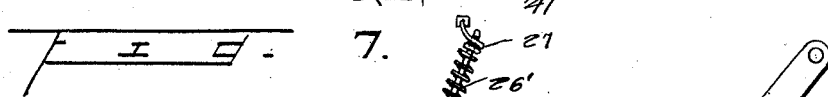
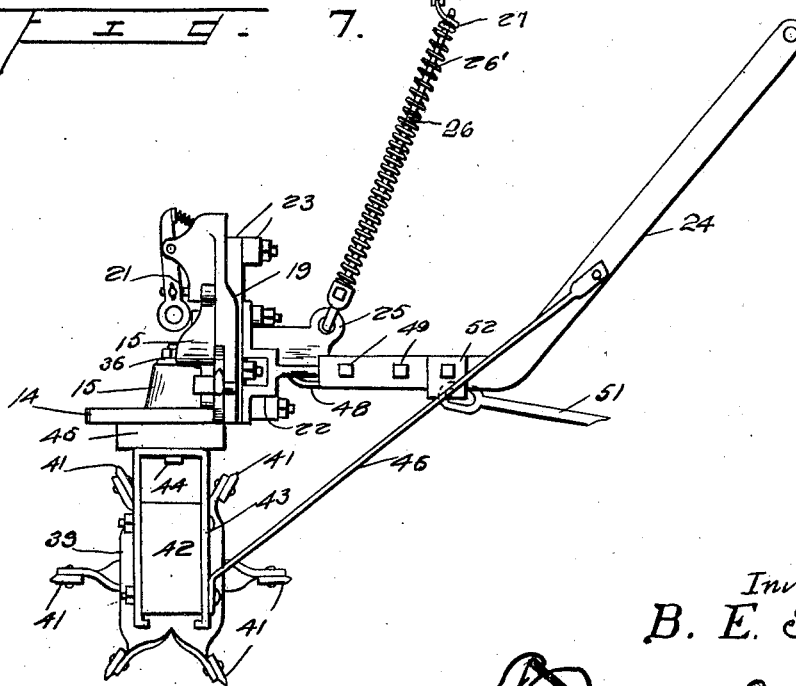
Inventor
B. E. Sims.
By *[signature]*,
Attorney

UNITED STATES PATENT OFFICE.

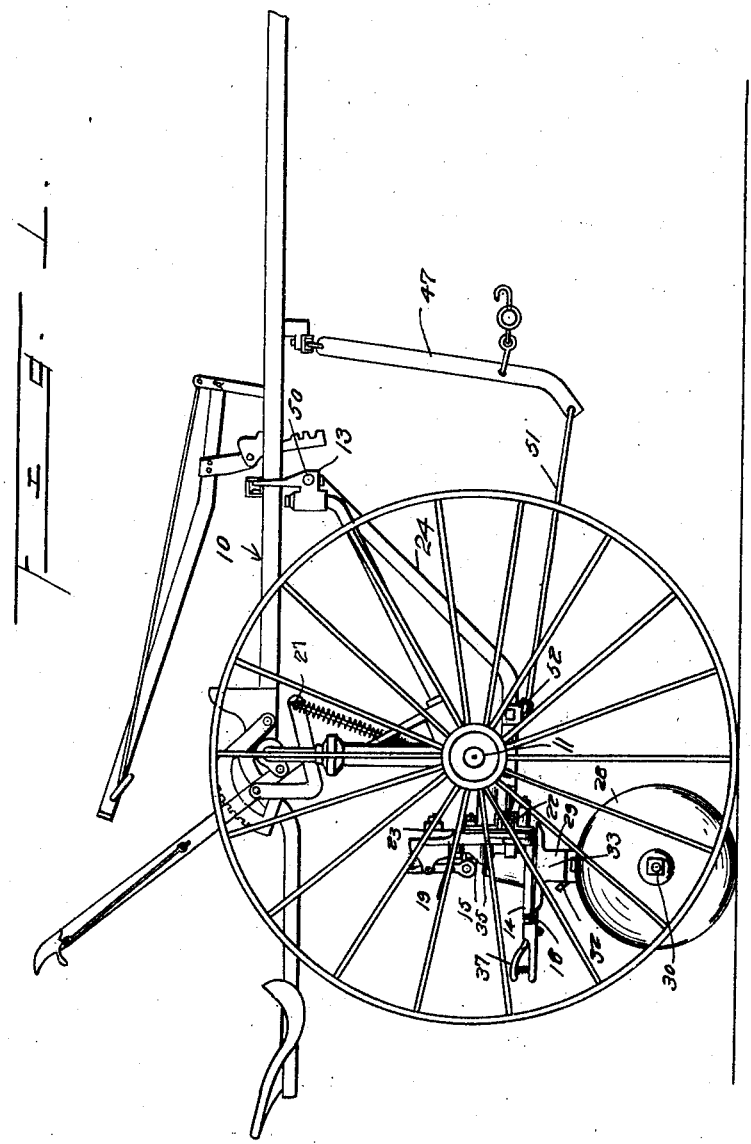

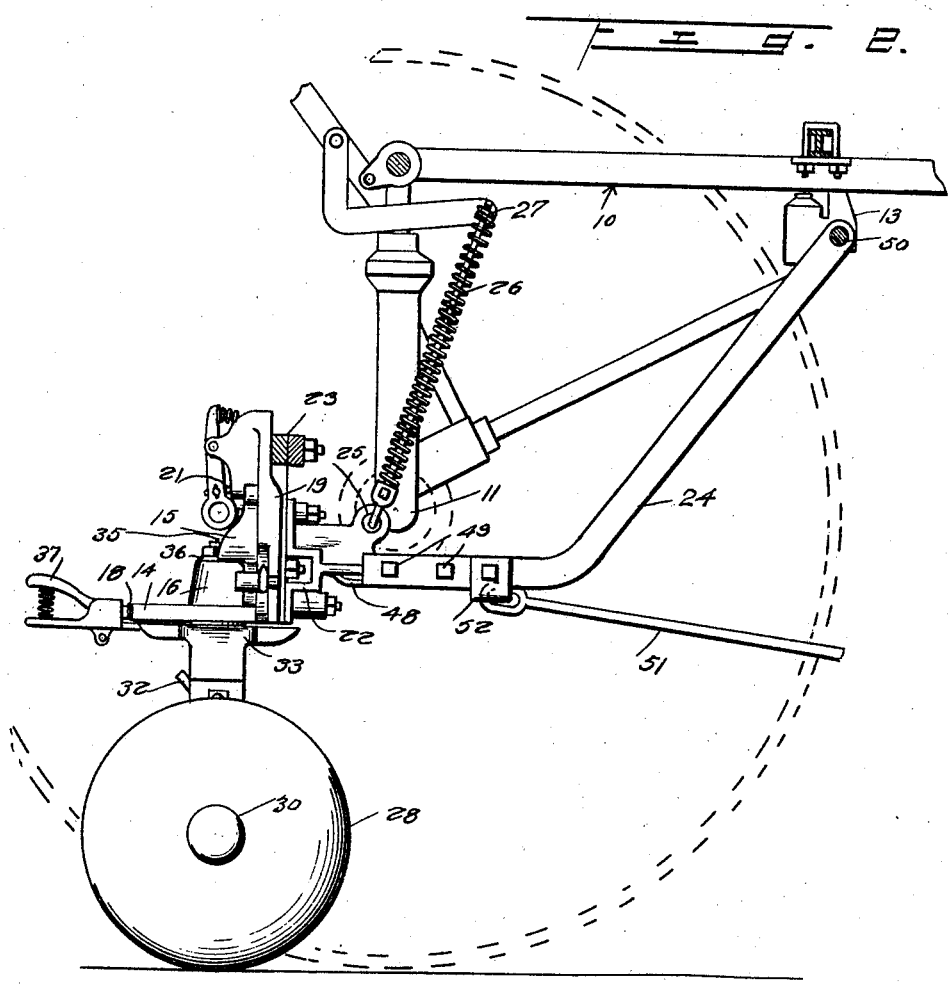
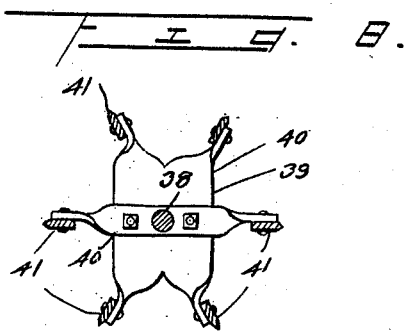

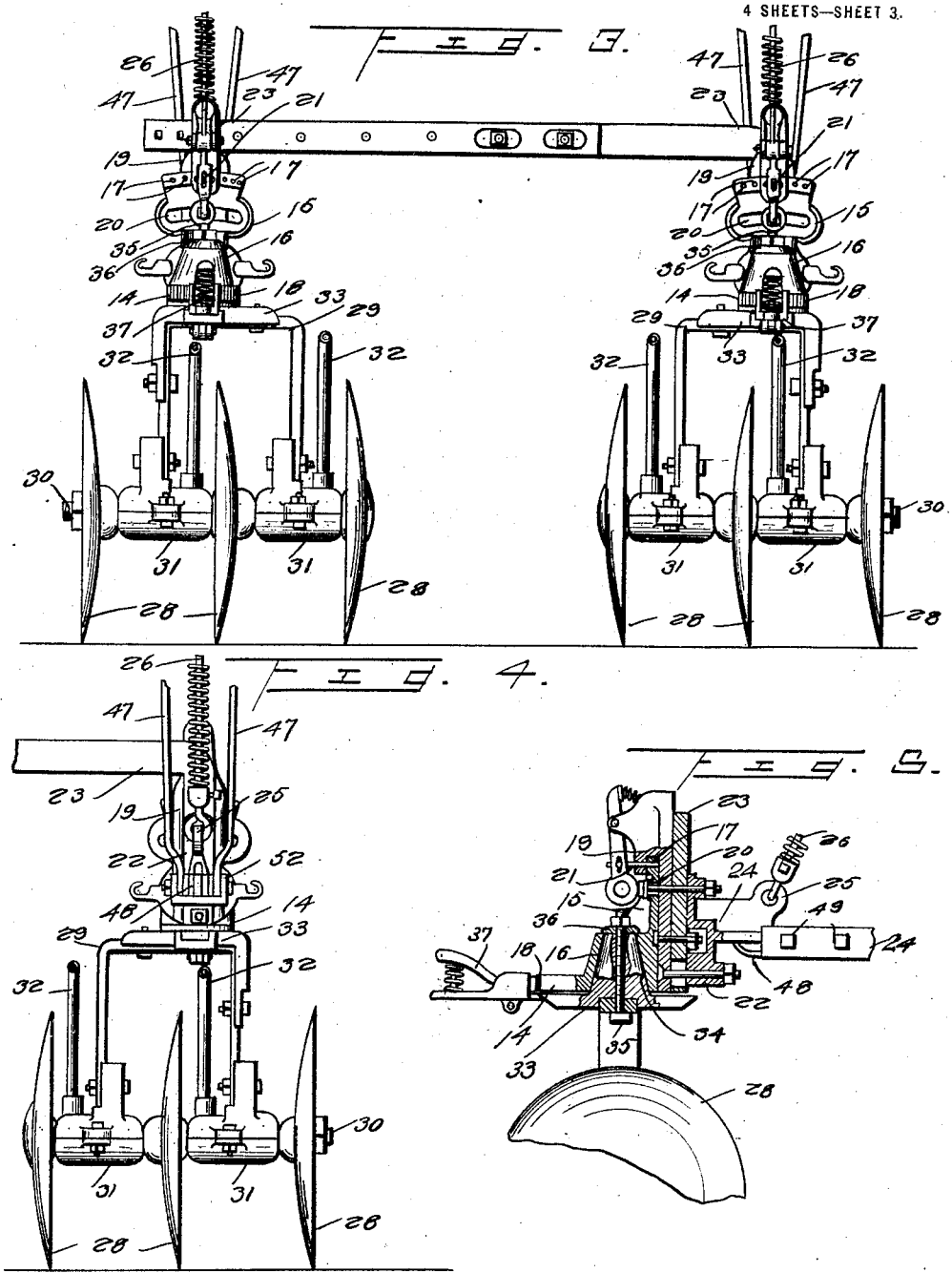

BENTON E. SIMS, OF OXFORD, ALABAMA.

CULTIVATOR ATTACHMENT.

1,394,367.  Specification of Letters Patent.  Patented Oct. 18, 1921.

Application filed August 29, 1919. Serial No. 320,673.

*To all whom it may concern:*

Be it known that I, BENTON EDWIN SIMS, a citizen of the United States, residing at Oxford, R. F. D. R. 5, in the county of Talladega and State of Alabama, have invented certain new and useful Improvements in Cultivator Attachments; and I do hereby declare the following to be a full, clear, and exact description of the invention, such as will enable others skilled in the art to which it appertains to make and use the same.

This invention relates to an improved cultivator attachment and the principal object of the invention is to provide an improved attachment whereby a disk harrow or a stalk chopper may be connected with a cultivator frame of a conventional construction, the attachment being so constructed that it may be assembled either as a disk harrow or as a stalk chopper.

Another object of the invention is to so construct this attachment that the two sections carrying the disk harrows or mountings for the stalk chopper may be held in the desired spaced relation.

Another object of the invention is to so construct this attachment that pressure rods may be associated therewith and connected with the frame of the cultivator to yieldably hold the harrow disks or chopper in engagement with the ground.

Another object of the invention is to so construct this attachment that it may be easily and quickly put in place and securely held in engagement with the cultivator thus providing for efficient operation and at the same time permitting easy and quick removal when desired.

This invention is illustrated in the accompanying drawings wherein:

Figure 1 is a view showing a conventional construction of cultivator in side elevation with the improved attachment in place and connected therewith.

Fig. 2 is a vertical longitudinal sectional view through the cultivator and attachment.

Fig. 3 is an enlarged view showing the improved attachment in rear elevation.

Fig. 4 is a front elevation of a portion of the attachment shown in rear elevation in Fig. 3.

Fig. 5 is a vertical sectional view through the mounting in which the disk carrying yoke is rotatably mounted.

Fig. 6 is a front elevation showing the attachment with the chopper substituted for the harrow disks shown in Fig. 4.

Fig. 7 is a side elevation of the attachment with the chopper in place.

Fig. 8 is a transverse sectional view through the chopper taken along the line 8—8 of Fig. 6.

This attachment is used in connection with a conventional construction of riding harrow frame indicated in general by the numeral 10 and provided with an axle 11 which it is customary to provide in this type of machine. As shown clearly in Figs. 1 and 2, the attachment will be connected with the cultivator through the medium of suitable brackets 13 and connecting suspending members, as will be later clearly described.

This attachment has duplicate side structures each of which is provided with a mounting including a casting provided with a base plate 14 and vertical plates 15, the base plate being provided with a bearing 16 and the vertical plate with openings forming a rack 17. Rack teeth 18 are formed upon the rear end portion of the base plate 14 for engagement by a pawl to be hereinafter described. A rocker plate 19 is pivotally connected with the vertical plates 15 and carries a pin which extends through the slot 20 to limit pivotal movement of the plate 19. This plate extends above the vertical plates 15 and terminates in a head carrying a latch pin 21 which will fit into one of the openings forming the rack 17 and releasably retain the plates 15 and 19 against relative movement. A bracket 22 is secured in rigid connection with the plate 19 by fasteners which further serve to secure the depending end portions of an arched bar section 33, one of these arched bar sections 33 being carried by each of the side sections of the attachment and when connected as shown in Figs. 3 and 4 providing an arch or yoke 29 which will retain the two side sections of the attachment in the desired spaced relation. The bracket 22 is provided with an extension 48 to which the draft beams or attaching beams 24, which may also be termed the connecting and suspending members, may be connected. These beams 24 extend forwardly and upwardly, as is usual in implements of this character, and have their upper ends mounted on the shaft extended through the bracket 13. The lower ends of the beams 24 are connected with the extension 48 of the bracket 22, as shown in Fig. 2 of the drawings and also Fig. 7. The beams 24 carry at their lower rear ends the U-shaped plates 52 to which are connected the rods 51 leading to the draft beams 47, as shown clearly in Fig. 1 of the drawings. The draft beams 47 are connected with the harrow frame 10 in the usual manner.

A pressure rod 26 is pivotally connected at its lower end to the eye 25 carried by the bracket 22 and has the usual helical spring 26' mounted thereon, a slidable eye bolt 27 being mounted on the upper end of the pressure rod and connected with an adjusting pressure lever 27' mounted in the usual manner on the harrow frame 10, so that when the attachment is in engagement with the ground after proper adjustment of the lever 27', the springs 26' on either side of the attachment being compressed between the eye bolt 27 and the lower end of the pressure rod 26, will serve to yieldably hold the attachment in engagement with the ground, as may be later more clearly understood.

The harrow disks 28 are carried by a yoke 29 in the usual manner through the medium of a shaft or axle 30 which passes through bearings 31 carried by the yoke 9, the bearings being provided with oil inlets from which extend pipes or oil conduits 32 so that the oil may be easily supplied to the bearings and the oil inlets prevented from becoming choked by dirt falling upon the bearings. The yoke is provided with a plate 33 which carries a hub 34 which will seat in the bearings 16, thus pivotally mounting the yoke. In order to retain the hub in place there is provided a bolt 35 which passes up through the bearing and through a cap 36. The securing nut for the bolt engages this cap or washer and retains the bolt and hub in place. A pawl 37 is connected with the plate 33, as shown, and is positioned in operative relation to the rack teeth 18 so that the yoke may be swung to position the harrow disks at the desired angle and then retain them in the adjusted position through engagement of the rack teeth by the pawl. From the above description it will be readily seen that the yoke may be pivotally adjusted for horizontal and transverse swinging adjustment, thus positioning the disks at the desired angle.

If it is desired to have the attachment assembled as a stalk chopper instead of as a harrow, the bolt 35 will be removed thus releasing the yoke and permitting it to be disconnected from the mounting. It is of course understood that both of the yokes will be removed. The stalk chopper will then be put in place as shown in Figs. 6 and 7. This stalk chopper is provided with a shaft 38 which carries heads 39 formed with radiating arms 40 with which the blades 41 are connected. The shaft extends beyond the heads and fits into sockets formed in the bearing blocks 42 which blocks are carried by brackets 43. These brackets 43 carry bolts 44 which take the place of the bolts 35 and will be passed through the bearings 16 and through the cap 36, spacing blocks 45 being provided to retain the brackets in the proper position beneath the base plate 14. In order to brace the brackets 43 there has been provided diagonally extending bracing rods 46 which are connected with the brackets and with the beams 47. It will be readily seen that the stalk chopper may be substituted for the disk harrow construction with the device connected with the cultivator frame or may be put in place with the device removed from the cultivator. There has thus been provided a very efficient attachment which will be strong and durable and which can be easily put in place or removed.

What is claimed is:

1. An agricultural implement having a bearing, a bearing movable relatively thereto, and means to selectively secure different implements to the movable bearing.

2. An agricultural implement having a bearing, a bearing movable relatively thereto having a flange overlapping the same, a pawl on the first bearing coöperating with the flange to lock the bearings against relative movement, said movable bearing having a groove in its base, an implement having a frame disposed in said groove, a bolt extending through the movable bearing and frame, and means extending from the bolt to overlap the first bearing.

3. An agricultural implement having a bearing, a bearing movable relatively thereto having a flange overlapping the same, a pawl on the first bearing coöperating with the flange to lock the bearings against relative movement, said movable bearing having a groove in its base, an implement having a frame disposed in said groove, a bolt extending through the movable bearing and frame, and means extending from the bolt to overlap the first bearing, the first bearing having a plate provided with an arcuate slot, a plate on which said plate is journaled, a bolt passing through the second plate and slot, a bracket mounted by said bolt, and connecting means secured to said bracket.

In testimony whereof I affix my signature in presence of two witnesses.

BENTON E. SIMS.

Witnesses:
R. A. HINGSON,
J. H. HINGSON.